Jan. 24, 1928.
A. B. CUMNER
FLUID GUN
Filed May 29, 1926
1,657,070
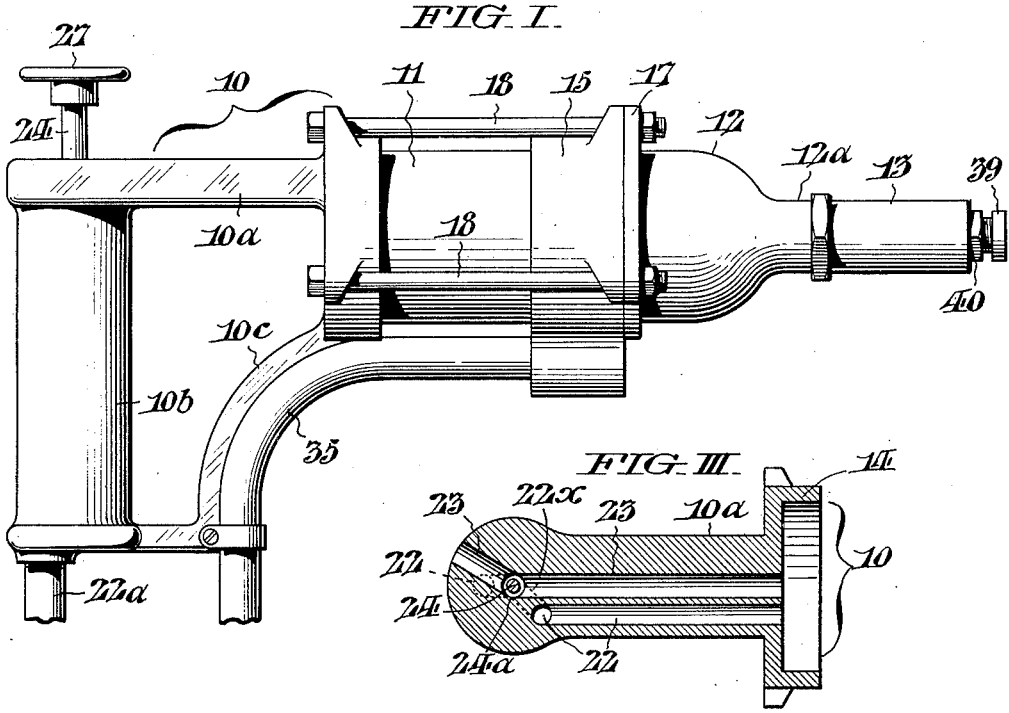
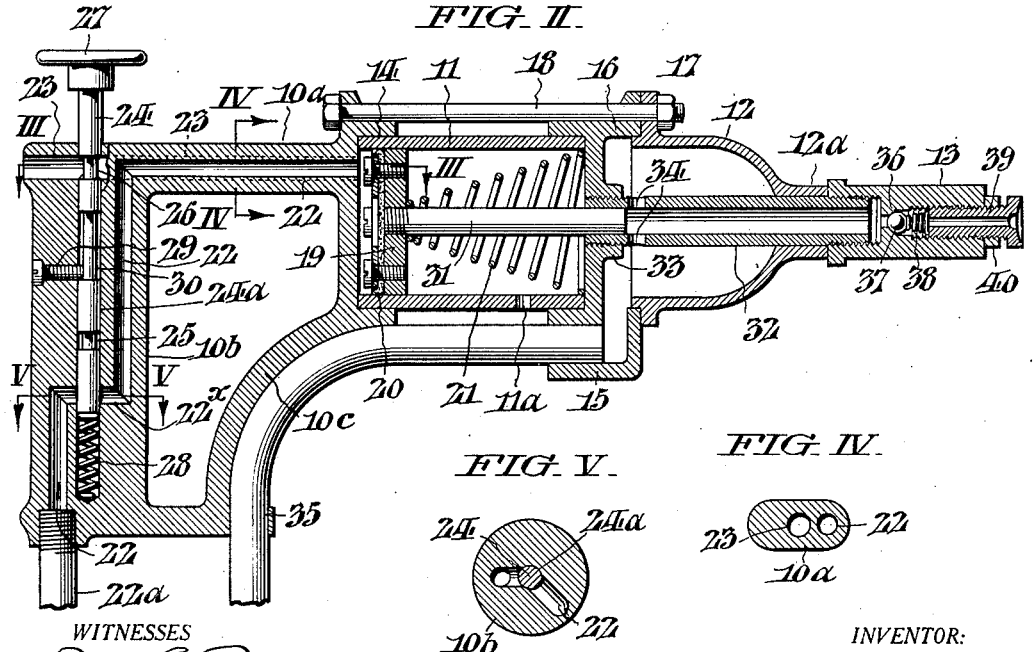
INVENTOR:
Arthur B. Cumner,
BY
ATTORNEYS.

Patented Jan. 24, 1928.

1,657,070

UNITED STATES PATENT OFFICE.

ARTHUR B. CUMNER, OF PHILADELPHIA, PENNSYLVANIA.

FLUID GUN.

Application filed May 29, 1926. Serial No. 112,457.

This invention relates to devices ordinarily known as fluid or grease guns, useful, for example, in connection with systems for lubricating the various bearings associated with the running gear of automobiles; and more specifically speaking, it is concerned with grease guns particularly suited to automobile service stations.

In the main, my invention is directed toward affording a structurally simple and easily operable device of the character referred to capable of utilizing compressed air or any other fluent pressure medium available at automobile service stations, in determining successive delivery of measured charges of the lubricant at pressures sufficiently high to overcome the resistance of, and to displace, any clogging matter likely to be held by rust or otherwise in the ducts of the bearings being oiled.

Other objects, as well as further advantages of my invention will be apparent from the detailed description which follows of the typical embodiment shown in the accompanying drawings.

Fig. I is a view of the gun in side elevation.

Fig. II is a staggered longitudinal sectional illustration of the device.

Figs. III, IV and V are detail sections taken locally as indicated by the arrows III—III, IV—IV and V—V in Fig. III.

From these illustrations, it will be observed that the device is suitably configured for ease in grasping, and embodies a part 10 analogous to the stock of a gun, together with a laterally-projecting barrel portion comprising a cylinder 11, and an axially-aligned dome-like shell section 12 with a nipple 13 forming an extension of the diametrically reduced forward extremity 12ª of said section 12. The inner end of the cylinder 11 is received within a machined recess 14 in the part 10, and its forward end closed and overlapped by a cap-like fitting 15 which is circumferentially extended at 16 to afford a seat for the projecting base flange 17 on the dome section 12, the several parts aforesaid being secured together by a number of tie bolts 18.

Within the cylinder 11 operates a piston 19 that is fitted with a renewable cup gasket 20, and adapted to be shifted to the normal return position illustrated by a helical spring 21, this action being permitted by virtue of a relief port 11ª at the forward end of said cylinder. Fluid pressure medium (preferably compressed air) for actuating the piston 19 is conducted to the cylinder 11 via a duct 22 that first extends longitudinally through the horizontal bridging portion 10ª of the stock 10, then downward, crosswise, and finally again downward through the vertical portion 10ᵇ of said stock to the bottom end of the latter where a supply pipe 22ª is connected; all as clearly shown in Fig. II. Exhaust from the cylinder 11 is by way of a duct 23 extending longitudinally through the horizontal bridging portion 10ª of the stock 10 side by side with the terminal end of the inlet duct 22, see Figs. III, IV, with its outlet end radially directed relative to the stock portion 10ᵇ for discharge directly into the atmosphere. Actuation of the piston 19 is controlled by a cylindric valve 24 shiftable within a vertical slideway 24ª axially of the stock 10 that intercepts the cross connecting portion 22ˣ of the intake duct 22, as well as the angular turn of the exhaust duct 23. The valve 24 has circumferential grooves 25, 26 which are suitably spaced to establish communication through the ducts 22 and 23 alternately, and is equipped at the protruding end with a button 27 whereby it may be depressed against the action of a compression spring 28 lodged in the base of the slideway 25. A stop screw 29, cooperative with upper and lower shoulders of a recession 30 in the valve 24, serves to limit the longitudinal movement of the latter in opposite directions, and also to retain it in the assembly.

Referring again to the piston 19 (Fig. II), it will be noted that the same is secured to a rod 31 operating as a plunger within a tube 32 which is passed through the diametrically-reduced end 12ª of the dome section 12 and screwed into a central boss 33 of the cap-like fitting 15. The tube 32 is in communication with the hollow of the dome section 12 through radial ports 34 for capacity to receive fluid or semi-fluid lubricant conducted to the device under pressure and from a suitable source of supply, not shown, through a pipe 35. This pipe 35 follows the rounded configuration 10ᶜ of the stock 10 and takes into the inner side of the part 15, as shown in Figs. I and II. The outer end of the tube 32 projects somewhat beyond the part 12 and is threaded (see Fig. II) to take the nipple 13. On its interior, the nipple 13 provides a seat 36 for a ball valve 37 that is urged inward by a spring 38 whereof the pressure is adjustable by means of a screw tip 39 threaded axially into said nipple, and the adjustment fixable by a jamb nut 40. As shown, the protruding end of the tip 39 is appropriately configured for direct application to standardized lubricating fittings of the kind ordinarily used in this art.

In operation, the return stroke of the plunger 31 under the action of the spring 21 influencing the piston 19, creates a vacuum in the tube 32 thereby facilitating flow thereinto, through the radial ports 34 of the lubricant conducted to the dome section 12, under pressure, by the pipe 35. The tube 32 thus acts as a measuring chamber to set apart, at each actuation of the plunger 31, a fixed quantity or charge of the lubricant. With the tube 32 now full, the button 27 is pressed thereby to lower the valve 24 which is attended by closing of the exhaust passage 23 and establishing of communication, by way of the duct 22, between the pressure fluid supply pipe 22ª and the cylinder 11. As a result, the piston 19 is advanced in opposition to the associated spring 21, and the plunger 31 carried forward to displace the charge of the lubricant from the tube 32 past the ball valve 37 and to expel such charge through the nipple 13 and tip 39. Now, it will be noted that by virtue of the very great difference in the areas of the piston 19 and the plunger 31, the pressure of the extrusion is correspondingly multiplied. With the parts proportioned as shown, it is possible to secure with compressed air at pressures ordinarily available in service station equipment, delivery of the lubricant with ample force to insure dislodgment of any clogging matter tending to resist penetration of the bearings being oiled.

As a consequence of its sectional construction, the device may obviously be readily taken apart either for periodic cleaning or for replacement of any worn parts, when required, after extensive use in practice.

Although I have described my invention as particularly useful for dispensing lubricating oil or grease, it may be employed, with equal advantages to those hereinbefore pointed out, in handling of other liquid or semi-solid substances.

Having thus described my invention, I claim:

1. A fluid gun comprising a dome-section chamber having an intercommunicating axial tube for receiving and measuring a definite charge of the fluid, a plunger operating in said tube, an axially alinged actuating cylinder connected to the aforesaid chamber and having a spring return piston, said piston being of considerably greater area than the plunger and direct connected to the aforesaid plunger, a stock having a zig-zag inlet duct through which fluent motive medium is conducted to the actuating cylinder, an exhaust duct paralleling the terminal portion of the inlet duct, and a valve recipocable in the stock, intersecting both ducts aforesaid, to control flow and exhaust of motive-medium therethrough.

2. In a fluid gun of the type described, a stock member having a staggered pressure-medium inlet duct including a cross-connecting portion, a separate exhaust duct paralleling the terminal part of the inlet duct with a relatively deflected outlet portion, a plunger valve intercepting the cross-connecting and outlet portions of said ducts, an actuating cylinder clamped to said stock and having a spring return piston with an axial plunger, and a dome-section with a concentric interconnecting tube—for receiving and measuring fluid—axially aligned with and attached to the actuating cylinder and under control of the plunger aforesaid, whereby a fixed quantity of the fluid charge is expelled under multiplied pressure at each actuation of the gun.

3. In a fluid gun of the type described, a stock member having a staggered pressure-medium inlet duct including a cross-connecting portion, a separate exhaust duct paralleling the terminal part of the inlet duct with an obtuse-angled outlet, a plunger valve intercepting both the cross-connecting and obtuse-angled portions of said ducts, an actuating cylinder clamped to said stock and having a spring return piston with an axial plunger, and a fluid-receiving dome including an axial measuring tube connecting with said chamber by radial ports, said measuring tube being controlled by the plunger aforesaid to effect expulsion of a fixed fluid charge under multiplied pressure with each actuation of the gun In testimony whereof, I have hereunto signed my name at Philadelphia, Pennsylvania, this 27th day of May, 1926.

ARTHUR B. CUMNER.